Nov. 11, 1941.  W. BIRKY  2,262,486
WHEEL LIFT
Filed May 6, 1940
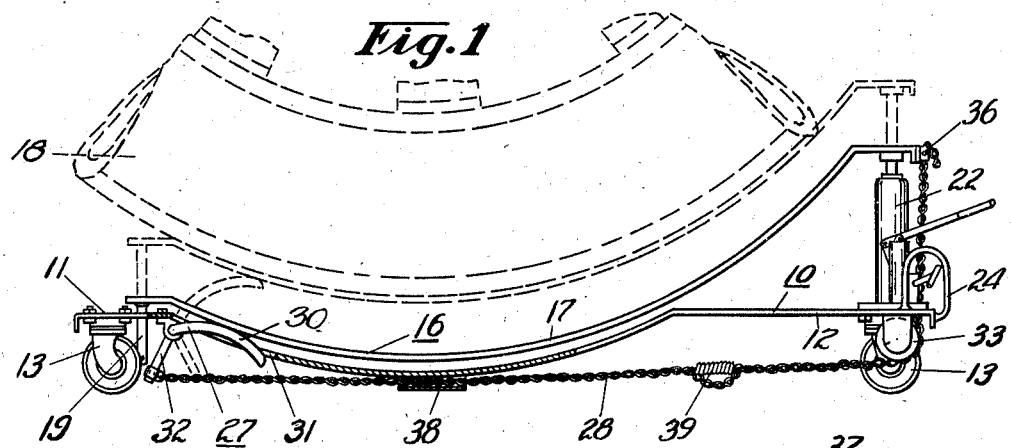
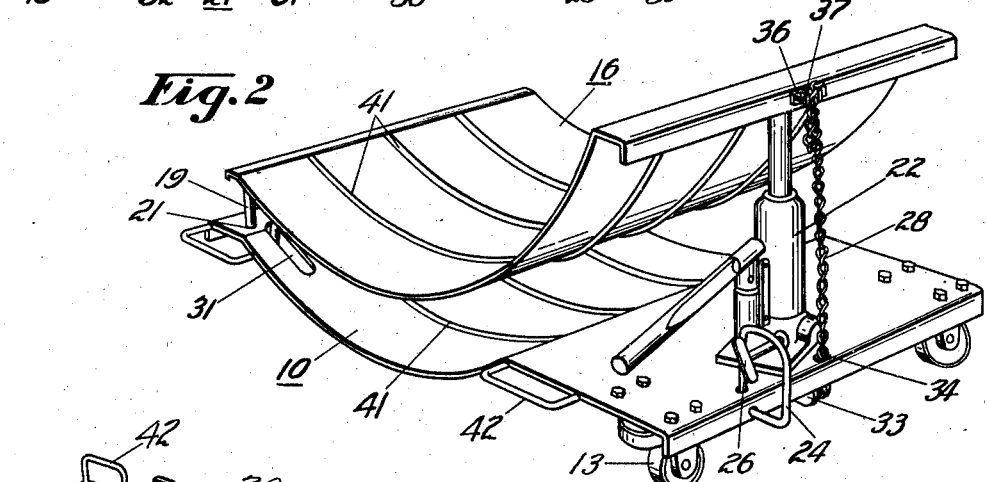
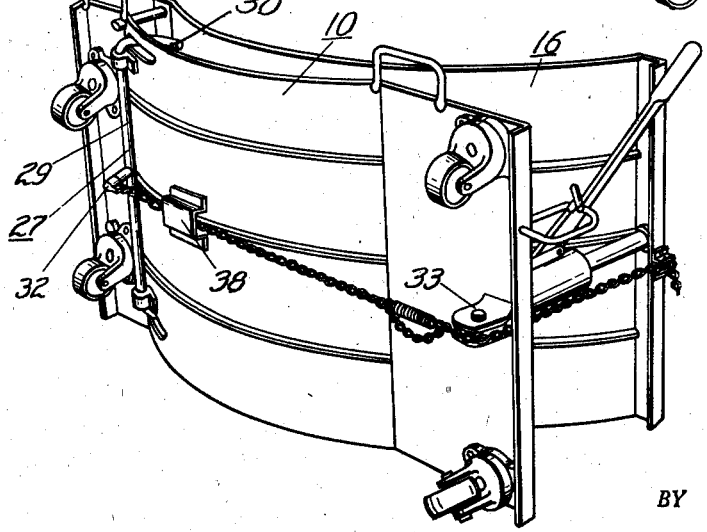
INVENTOR.
WILLIAM BIRKY
BY Flournoy Corey
ATTORNEY.

Patented Nov. 11, 1941

2,262,486

UNITED STATES PATENT OFFICE 2,262,486

WHEEL LIFT

William Birky, Cedar Rapids, Iowa

Application May 6, 1940, Serial No. 333,510

7 Claims. (Cl. 254—2)

This invention relates to motor vehicle servicing equipment and has particular relation to a dolly for use in removing or replacing the tires or wheels of vehicles.

It is necessary to service the running equipment of motor vehicles such as the wheel bearings, brakes and the like, periodically as well as to repair or replace the tires. In the case of the ordinary small passenger car, such service can ordinarily be performed in a more or less inefficient manner without special equipment.

In the case of heavier road equipment, such as transport or highway trailers, however, service is necessary at relatively short intervals and the wheel and tire equipment of such vehicles is ordinarily extremely heavy and awkward to handle. As an example of the service required on these vehicles, it is necessary to grease the bearings of all free running wheels periodically, and it is necessary and a more or less difficult task to properly align a wheel with its axle when replacing it, and to align a keyway in the wheel with a key on the axle, at the same time.

Numerous makeshift methods have been employed by service men in meeting this problem, one of these methods being to slide a wheel off its axle on a strip of greased sheet metal after the weight of the truck has been removed from the wheel. Such methods, of course, have many disadvantages and are slow. The ability to handle service problems of this nature speedily is, of course, always desirable but becomes almost essential in the case of fleet operators and others operating on a schedule.

It is, therefore, a primary object of my invention to provide a movable dolly or wheel truck such as may be readily moved into position for operation and which may be manipulated by one man to position a tire or wheel where desired.

It is another object of my invention to provide a dolly of the character described adapted to be received under a wheel which may have been raised but a short distance off the ground.

A further object of the invention is to provide a device of this nature adapted to utilize a vertically movable platform, a lifting jack of either standard or special construction for lifting one end of the platform and simplified means, actuated by movement of the one end of the platform or jack, for simultaneously lifting the other end of the platform whereby movement of the upper platform is entirely vertical without tipping or pivoting movement.

A still further object of my invention is to provide a simple structure of this nature and one which may be manufactured at relatively low cost.

Other and further features and objects of the invention will be more apparent to those skilled in the art upon a consideration of the accompanying drawing and following specifications, wherein is disclosed a single exemplary embodiment of the invention, with the understanding, however, that such changes may be made therein as fall within the scope of the appended claims, without departing from the spirit of the invention.

In said drawing:

Figure 1 is a side elevational view of a wheel lift constructed in accordance with a preferred embodiment of my invention and illustrates how a wheel is supported on the upper platform or cradle.

Figure 2 is a view in perspective of the device shown in Figure 1, and

Figure 3 illustrates, in perspective, the same structure shown in Figures 1 and 2 as viewed from below.

Referring now to the drawing:

A wheel lift, constructed in accordance with the preferred embodiment of my invention, includes a lower or main frame 10 mounted on casters as shown at 13, an upper or movable platform 16, a lifting jack 22 positioned above one end of the main frame, and cam means indicated generally at 27 positioned in the end of the main frame opposite the jack but operatively connected with the jack or with the movable platform adjacent thereto for causing the platform to move in a vertical plane, so as to remain always in a relatively horizontal position when lifting or lowering a wheel.

The lower or main frame 10 may be formed of a single piece of heavy sheet metal with flat portions 11 and 12 on which the casters 13 may be mounted. A portion of this main frame between the casters is arcuately formed as at 14 to receive the upper or movable platform 16 which is arcuately formed in the same manner and as shown at 17 to accommodate the wheel or tire 18 of a vehicle.

This upper platform 16 is guided in a vertical plane and held in proper position relative to the main frame 10 by a pair of guide rods 19 welded or otherwise secured to the underside of the movable frame and slidably received in holes 21 in the main frame.

The lifting jack 22 is preferably supported on the end of the main frame opposite these guide rods, with the head 23 of the jack bearing against the under side of the movable platform. This jack 22 may be of any desired type, but I have found the hydraulic type to be very satisfactory for this application. It is preferable that the base of the jack be permanently secured to the main frame 10 and that a guard 24 be provided to protect the operating valve 26 of the jack.

Both ends of the movable platform are raised simultaneously by means of the crank-like cam structure indicated generally at 27, and a cam operating means preferably in the form of a chain 28 in conjunction with the jack 22.

The cam lift may comprise a cross shaft 29 mounted for rotation on the underside of the main frame. This shaft is formed on its ends to provide arcuately shaped portions 30. These portions 30 or cam members may extend upwardly through slots 31 in the frame to engage the under surface of the movable platform. It will now be apparent that rotation of the cross shaft in a counter-clockwise direction (Figure 1) will result in a lifting action by the cam members to raise the movable platform at one end and by the jack to raise the other end.

The rotation of the cross shaft is secured by a lever arm 32 welded or otherwise attached to the shaft, and the chain 28 attached to this lever arm. The chain extends along the under side of the frame and is passed around an idler pulley 33 attached to the lower surface of the frame below the jack 22, and then upwardly through an opening 34 in the frame to the movable platform where it is attached. The chain may be bolted or welded at this point, but it is preferable that a bracket 36 be provided through which the chain may pass, and that means be provided such as the pin 37 for detachably securing the chain.

A guide member or clip 38 is attached to the under surface of the frame to prevent the chain from dragging on the ground.

It is preferable that means, such as the spring 39, be provided to take up any slack in the chain as well as provide some resilience in the structure if the jack is raised too high.

Ribs 41 may be formed in both the frame and the movable platform, if desired, to strengthen those members and make possible the use of relatively light weight materials.

A pair of handles may be attached to the side of the frame, as at 42, to facilitate handling the device.

In use, the axle of the vehicle being serviced is raised, in the usual manner, sufficiently to permit my dolly or wheel jack to be rolled into place beneath the tire. The jack 22 on my wheel lift is then operated to support the weight of the wheel and after the attachment bolts and lugs have been removed, the wheel or tire may be rolled away on the dolly. Replacement of a wheel is just as simple. The wheel is rolled into place on the dolly and then jacked up into exact alignment with the axle and slid into place, the entire weight of the wheel and tire being borne by the dolly.

Although I have shown and described a specific embodiment of my invention, it is apparent that modifications thereof may be made by those skilled in the art. Such modifications may be made without departing from the spirit and scope of my invention as set forth in the appended claims.

I claim as my invention:

1. In a wheel lift of the character described, a mobile base, a trough-shaped platform vertically movable relative to the base, the lowest portion of the trough of the platform adapted to be supported close above the ground, spaced lifting means for raising the platform substantially equal distances at all points, and flexible means extending below the mobile base for operatively connecting the said lifting means for simultaneous movement.

2. In a wheel lift, a plate-like base member formed with a trough-like under-hung center portion, movable members for supporting the base with the trough-like portion close above the ground, a movable platform supported above the base and also having a trough-like recess adapted to fit within the trough-like portion of the base, said trough-like portion of the movable platform adapted to receive a vehicle wheel and support the wheel, a jack disposed between the base and platform members at one end thereof, and lifting means between the opposite ends thereof, the last mentioned lifting means being operatively connected with the jack by flexible means passing in under the trough-like base portion.

3. In a wheel lift, a mobile platform and a second platform vertically movable with respect to the first, means for raising the second named platform with reference to the first, and means for guiding the platform in its vertical movement including a jack at one end thereof and pins passing through the base at the other end thereof, the jack being used also for supplying power for raising one end of the movable platform, other means for lifting the opposite end of the movable platform, and flexible means extending below the mobile platform for operatively connecting the jack and the other lifting means.

4. In a wheel lift, a mobile base, a movable platform above the base, the base having a portion thereof extending in a horizontal plane, a jack mounted on this horizontal portion of the base and having the ram thereof bearing against one end of the movable platform, cams rotatably mounted on the base and adapted to bear against the other end of the movable platform, and flexible means attached at the same end of the movable portion of the platform that the jack bears against and connecting this portion of the movable platform with the cams at the other end of the base for raising the other end of the base.

5. In a wheel lift, a base, a jack mounted on one end of the base, a movable platform with the ram of the jack bearing against one end of the movable platform for raising and lowering it, means for transferring the vertical movement of the first named end of the movable platform to the other end of the movable platform including a flexible connecting member extending downwardly over a pulley on the base and horizontally to the other end of the base, and cam members bearing against the movable platform, pivotally engaged to the base and adapted to be operated by the flexible connecting member.

6. In a wheel lift, a base, a jack mounted at one end of the base, cam means having a shaft mounted for rotation at the other end of the base, a platform disposed above the base and resting on the jack and on the cam arms, and means for transmitting motion of the jack and of the movable platform to the cam shaft to raise or lower both ends of the platform at the same time.

7. In a wheel lift, a base including two end portions, castors for supporting said end portions, an upper platform curved in a vertical plane to receive vehicle wheels, said curved portion being receivable between the end portions of the base whereby it may be placed close above the floor level, jack means disposed between the base and upper platform at one end thereof, a cam shaft, cam means mounted thereon and disposed between the base and upper platform at the opposite end thereof, a lever arm on the cam shaft, and operating means passing below the curved portion of the platform, connected at one end to said lever arm and at the other end to the lifting jack for causing lifting movement of the cams simultaneous with that of the jack.

WILLIAM BIRKY.